(12) United States Patent
Sato

(10) Patent No.: US 6,312,785 B1
(45) Date of Patent: Nov. 6, 2001

(54) MAGNETIC RECORDING MEDIUM

(75) Inventor: Satoshi Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/482,916

(22) Filed: Jan. 14, 2000

(30) Foreign Application Priority Data

Jan. 19, 1999 (JP) ............................................. P11-010837

(51) Int. Cl.[7] ....................................................... G11B 5/73
(52) U.S. Cl. ........................ 428/141; 428/323; 428/336; 428/216; 428/457; 428/474.4; 428/694 SG; 428/900
(58) Field of Search ..................................... 428/141, 323, 428/336, 216, 457, 474.4, 694 SG, 900

(56) References Cited

FOREIGN PATENT DOCUMENTS 11-120535 * 4/1999 (JP) .

* cited by examiner

Primary Examiner—Stevan A. Resan
(74) Attorney, Agent, or Firm—Sonnenschein, Nath & Rosenthal

(57) ABSTRACT

A magnetic recording medium exhibiting an excellent electromagnetic conversion characteristic and a satisfactory movement characteristic if an aromatic polyamide film is employed as a non-magnetic support member thereof. The magnetic recording medium according to the present invention incorporates a non-magnetic support member on which a magnetic layer constituted by a thin metal magnetic film is formed, wherein at least either main surface of the non-magnetic support member has small projections, and the either main surface of the non-magnetic support member having the small projections formed thereon has a kurtosis (Ku) which is 10.0 to 50.0, average roughness Ra at the central surface of either main surface of the non-magnetic support member is 1.0 nm to 5.0 nm, and average roughness Rz of ten points on either main surface of the non-magnetic support member is 15 nm to 50 nm.

8 Claims, 1 Drawing Sheet

MAGNETIC RECORDING MEDIUM

RELATED APPLICATION DATA

The present application claims priority to Japanese Application No. P11-010837 filed Jan. 19, 1999, which application is incorporated herein by reference to the extent permitted by law.

BACKGROUND OF THE INVENTION

1. Field of the Invention

The present invention relates to a magnetic recording medium incorporating a non-magnetic support member on which a thin metal magnetic film is formed, and more particularly to a magnetic recording medium for use as a video tape which is capable of recording data for a long time or a taper streamer having a large capacity.

2. Description of the Related Art

Hitherto, a support member for a thin metal-magnetic-film magnetic recording medium has been mainly composed of polyethylene terephthalate film because of relatively satisfactory strength of its material and dimension stability. In particular, a home video cassette tape, for example, 8 mm-tape has been constituted by a polyethylene terephthalate film having a thickness of about 7 $\mu$m to about 10 $\mu$m. The tape streamer incorporates the polyethylene terephthalate film of a type having a thickness of about 5 $\mu$m to about 7 $\mu$m.

In recent years, the cassette size of each of DVC (Digital Video Cassette) tapes among the video cassette tapes has been reduced. A longer recording operation has been required. Also in the industrial field of the tape streamer tape including D8 (Data 8 mm) and DDS (Digital Data Storage), larger capacity has been required.

To realize the long recording operation and enlargement of the capacity of the magnetic recording medium, the thickness of the base film must be reduced. Reduction in the thickness, however, encounters a problem in that the stiffness of the magnetic recording medium is decreased and the skew characteristic deteriorates.

To realize satisfactorily high stiffness and a sense amplifier skew characteristic, contradictory characteristics, that is, the base film must have high strength and resistance against heat shrinkage, must simultaneously be satisfied. Therefore, the polyethylene terephthalate film has been subjected to a re-orienting process or the like to increase the strength. Moreover, an aging process or the like has been performed to prevent heat shrinkage.

Recently the strength of the polyethylene terephthalate film is limited because the thickness of the film has furthermore been reduced. As a next generation of a base film for a high-density magnetic recording medium, an aromatic polyamide film exhibiting high strength and restrained heat shrinkage has attracted attention.

Since long-time recording and enlargement of the capacity have been realized, the magnetic recording medium must have furthermore improved characteristics. That is, the magnetic recording medium must have a furthermore improved electromagnetic conversion characteristic and a reduced error rate.

From the above-mentioned viewpoints, it is preferable that the surface of the base film is a flat mirror surface which is free from any projection. An evaporated film formed on the foregoing base film, however, suffers from unsatisfactory movement characteristic because the mirror surface of the base film is maintained. Thus, there arises a problem in that a scuff occurs and the error rate is undesirably raised owing to separation of powder from the evaporated film.

SUMMARY OF THE INVENTION

In view of the foregoing, an object of the present invention is to provide a magnetic recording medium which exhibits a satisfactory electromagnetic conversion characteristic and movement characteristic if the magnetic recording medium incorporates a non-magnetic support member constituted by an aromatic polyamide film.

To achieve the above-mentioned object, according to one aspect of the present invention, there is provided a magnetic recording medium comprising: a non-magnetic support member on which a magnetic layer constituted by a thin metal magnetic film is formed, wherein at least either main surface of the non-magnetic support member has small projections, and the either main surface of the non-magnetic support member having the small projections formed thereon has a kurtosis (Ku) which is expressed by the following equation (1) and which is 10.0 to 50.0:

$$Ku = (1/SRq^4) \cdot (1/n) \sum_{i=1}^{n} Yi^4 \tag{1}$$

$$SRq = \sqrt{(1/Lx \cdot Ly) \int_0^{Lx} \int_0^{Ly} f(x,y)^2 \, dx \, dy}$$

where f(x) is a roughness curve with respect to the central surface and Lx and Ly are lengths in the directions X and Y on the surface, average roughness Ra at the central surface of either main surface of the non-magnetic support member is 1.0 nm to 5.0 nm, and average roughness Rz of ten points on either main surface of the non-magnetic support member is 15 nm to 50 nm.

The magnetic recording medium according to the present invention and structured as described above is arranged such that the kurtosis (Ku) of the small projections formed on either main surface of the non-magnetic support member, the average roughness of the central surface of either main surface of the non-magnetic support member and the average roughness of ten points are specified to predetermined values. The thin metal magnetic film is formed on the non-magnetic support member. The magnetic recording medium according to the present invention is characterized in that the main surface of the thin metal magnetic film has required flatness.

Note that the kurtosis Ku, the average roughness of the central surface and the average roughness of ten points are values measured by a so-called atomic force microscope (AFM). Specifically, an atomic force microscope manufactured by Digital Instruments was used to measure the foregoing values.

Other objects, features and advantages of the invention will be evident from the following detailed description of the preferred embodiments described in conjunction with the attached drawings.

DESCRIPTION OF THE PREFERRED EMBODIMENTS

An embodiment of the present invention will now be described with reference to the drawings.

Figure 1:
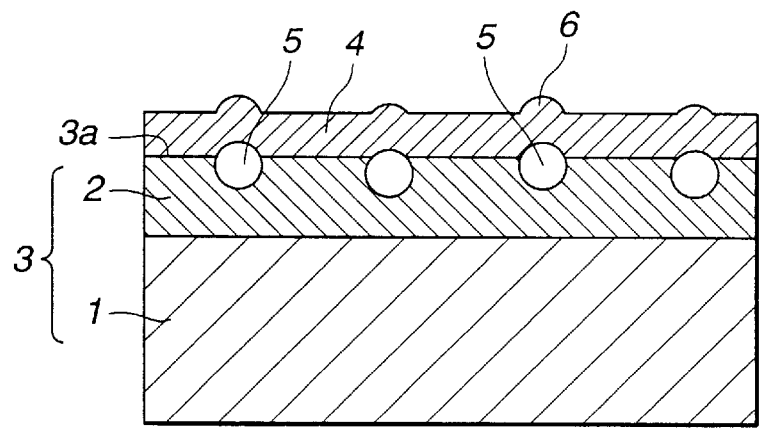
FIG. 1 is a schematic cross sectional view showing an essential portion of an example of a magnetic recording medium according to the present invention.

The magnetic recording medium according to this embodiment, as shown in FIG. 1, incorporates a non-magnetic support member 3 constituted by laminating a base layer 1 and a continuous coating film 2; and a magnetic layer 4 formed on either main surface 3a of the non-magnetic support member 3 and constituted by a thin metal magnetic film.

Small projections are formed on the main surface of the non-magnetic support member 3 of the magnetic recording medium according to this embodiment. The magnetic layer 4 is formed on the main surface having the small projections formed thereon. The magnetic recording medium has a structure that the main surface 3a of the non-magnetic support member 3 having the small projections formed thereon has Ku (kurtosis) which is expressed by the following equation (1) and which is 10.0 to 50.0.

$$Ku = (1/SRq^4) \cdot (1/n) \sum_{i=1}^{n} Yi^4 \quad (1)$$

$$SRq = \sqrt{(1/Lx \cdot Ly) \int_0^{Lx} \int_0^{Ly} f(x, y)^2 \, dx \, dy}$$

where f (x) is a roughness curve with respect to the central surface and Lx and Ly are lengths in the directions X and Y on the surface.

The magnetic recording medium according to this embodiment has the structure that the average roughness SRa of the central surface of the main surface 3a of the non-magnetic support member 3 expressed by the equation (2) is 1.0 nm to 5.0 nm. Moreover, average roughness SRz of ten points of the main surface 3a expressed by the following equation (3) is 15 nm to 50 nm.

$$SRa = (1/LxLy) \int_0^{Lx} \int_0^{Ly} |f(x,y)| dx dy \quad (2)$$

$$SRz = (|Yp1| + \ldots + Yp5| + |Yv1| + \ldots + Yv5|)/5 \quad (3)$$

where f (x) is a roughness curve with respect to the central surface, Lx and Ly are lengths in the directions X and Y on the surface and YPn and Yvn are a crest having the n-th height from an average line and a root having the n-th depth from the same.

The kurtosis (Ku), the average roughness (SRa) of the central surface and the average roughness (SRz) of the ten points were measured by using an atomic force microscope (AFM) manufactured by Digital Instruments. The measurement was performed such that the scan size was made to be 5 μm×5 μm and the number of sampling points were 512 points and the scan rate was 1.5 Hz.

The magnetic recording medium according to this embodiment has a structure that the non-magnetic support member 3 has the above-mentioned specified surface characteristics. To achieve this, the base layer 1 of the non-magnetic support member 3 is made of, for example, an aromatic polyamide film. Moreover, small particles 5 are contained in the continuous coating film 2 so that small projections 6 are formed on the main surface.

The base layer 1 has a thickness of about 2.0 μm to 5.0 μm and contains inactive particles. Since the inactive particles are contained in the base layer 1, required coarse projections (not shown) are formed on the main surface 3a of the non-magnetic support member 3.

It is preferable that the aromatic polyamide film employed to constitute the base layer 1 is an aromatic polyamide film containing repeated units expressed by the following general formula (I) and/or general formula (II) by 50 mol % or greater, more preferably 70 mol % or greater.

  General Formula (I)
  General Formula (II)

where $Ar_1$, $Ar_2$ and $Ar_3$ are, for example,

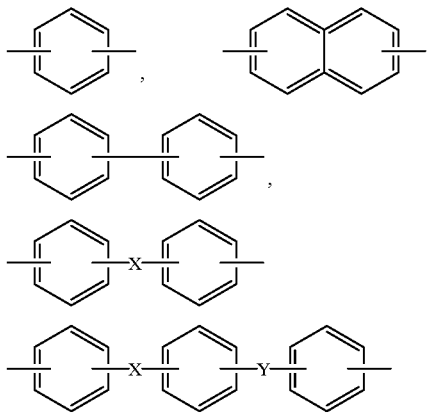

Although X and Y are selected from —O—, —CH$_2$—, —CO—, —SO$_2$—, —S— and —C(CH$_3$)$_1$—, the present invention is not limited to the foregoing materials. Moreover, any one of the following groups may be substituted for a portion of hydrogen atoms on the aromatic ring: a halogen group (in particular, chlorine) of chlorine, fluorine or bromine; an alkyl group (in particular, a methyl group), such as a nitro group, a methyl group, an ethyl group or a propyl group; or an alkoxy group, such as an ethoxy group, a methoxy group, a propoxy group or an isopropoxy group. A substituent may be substituted for hydrogen in an amide bond which constitutes the polymer.

It is preferable that each of the chemical formulas expressed as $AR_1$, $Ar_2$ and $Ar_3$ has a structure that a portion bonded at the para position of the aromatic ring is 50% or more of all of aromatic rings, preferably 75% or more. When the aromatic polyamide film is specified as described above, a film can be obtained which exhibits satisfactory dimension stability against heat and high elasticity. When the ratio of aromatic rings of a type in which a halogen group (in particular, chlorine) is substituted for a portion of hydrogen atoms on the aromatic ring is 30% or higher, preferably 50% or higher and most preferably 70% or higher, the humidity expansion coefficient of the aromatic polyamide film can satisfactorily be reduced.

In addition to the repeated units expressed by general formula (I) and/or general formula (II), the aromatic polyamide film according to this embodiment may contain the other repeated units which are copolymerized or blended. Moreover, lubricant, an oxidation inhibitor or other additives may be blended with the aromatic polyamide film according to this embodiment.

The continuous coating film 2 is formed by applying a coating material mainly composed of aqueous polymer and small particles 5 to the surface of the above-mentioned base layer 1.

The small particles 5 are exemplified by inorganic particles of silica, calcium carbonate, titanium dioxide, alumina, caoline, talc, graphite, feldspar, molybdenum dioxide, carbon black or barium nitrate; polystyrene; polymethylmethacrylate; methylmethacrylate copolymer; crosslinked material of methylmethacrylate copolymer; and organic particles of polytetrafluoroethylene, polyvinylidene fluoride, acrylonitrile or benzoguanamine. In particular, it is preferable that the small particles are particles of colloidal silica or crosslinked polymer from which spherical particles can easily be obtained.

The aqueous polymer is a polymer material which is formed into suspension or emulsion when it is dissolved in water or, if necessary, a surface active agent or the like is added to the same and a material formed into polymer by furthermore crosslinking the foregoing polymer.

The aqueous polymer is exemplified by starch, cellulose derivative, such as methyl cellulose or hydroxyethyl cellulose, alginic acid, gum arabic, gelatin, sodium polyacrylate, polyacrylic amide, polyvinyl alcohol, polyethylene oxide, polyvinyl pyrolidone, polyvinyl chloride, polystyrene silicon resin, urethane resin, acrylic resin, ether resin, epoxy resin and ester resin.

The silicon resin may be a material mainly composed of polyorganocyloxane in which the substituent of cyloxane is mainly composed of methyl groups. In addition to the methyl groups, any one of the following groups is partially introduced as the substituent: a hydroxyl group, an α-methyl styrene group, an oxyalkylene group, an unsaturated group, a chlorophenyl group, a trifluoropropyl group, an epoxy group, a vinyl group, a carboxylic group, a phenyl group, an amino group, a cyanoethyl group an α-olefine group, a hydroxy group, a mercapto group and a halogenated alkyl group. It is preferable that the foregoing substituent has a terminal which has an epoxy group, an amino group, a hydroxy group or another function terminal group.

The organopolycyloxane can be formed into an aqueous structure by a known manufacturing method, such as emulsifying or dissolving, in aqueous solvent or as aqueous emulsion which is obtained by emulsifying polymerization of silane or siloxane.

The urethane resin may be aqueous urethane resin, the main components of which are polyisocyanate, polyol, a chain-lengthening material and a crosslinking material. When the aqueous material forming operation is performed, polyisocyanate, polyol or a material obtained by introducing a hydrophilic group into a chain-lengthening material is usually employed. As an alternative to this, non-reacted isocyanate of polyurethane and a compound having a hydrophilic group may be caused to react each other.

The ether resin is exemplified by polyethylene glycol, polypropylene glycol, polytetramethylene glycol, copolymer of ethylene oxide and propylene oxide and copolymer of ethylene oxide and tetrahydrofuran.

The ester resin may be a reactant between aromatic dicarboxylic acid, such as terephthalic acid or isophthalic acid, their ester forming derivative, aliphatic carboxylic acid, such as adipic acid, azelaic acid or sebacylic acid, their ester forming derivative and diol, such as ethylene glycol, propylene glycol, 1,4-butane diol, 1,4-cyclohexane dimethanol, diethylene glycol or polyethylene glycol. When the aqueous material forming operation is performed, a known method may be employed with which a compound having a sulfonic acid is copolymerized together with the foregoing components. In the foregoing operation, the following material is usually employed: alkalic metal salt or alkaline earth metal salt, such as sulfoisophthalic acid, sulfoterepthalic acid, 4-sulfonaphthalene-2,7-dicarboxylic acid or their ester forming derivative.

Note that the aqueous polymer may be added with a hardening material, if necessary.

In the present invention, the small projections 6 may be formed by adding an organic material which is the same types as the aromatic polyamide resin which is the raw material of the small particles 5 contained in the non-magnetic support member 3 in the form of a single layer and the base layer 1 and which is not dissolved in the solvent when the foregoing solution is prepared.

On the other hand, the main surface 3a of the non-magnetic support member 3 has coarse projections each having the size larger than that of each of the small projections 6 and formed by using inactive particles having an average particles size of about 50 nm to 200 nm. The inactive particles are exemplified by silica particles.

The thin metal magnetic film is exemplified by a thin metal magnetic film mainly composed of, for example, Co, Ni, Fe or a thin metal magnetic film mainly composed of their alloy. It is preferable that the thickness of the magnetic layer 4 constituted by the thin metal magnetic film is 0.05 $\mu$m to 0.2 $\mu$m, more preferably 0.1 $\mu$m to 0.2 $\mu$m. That is, if the thickness of the magnetic layer 4 is reduced, the self-demagnetization loss and the like can be reduced. Moreover, the overall thickness of the magnetic recording medium can be reduced in addition to the reduction of the thickness of the non-magnetic support member 3. Therefore, the overall length of the magnetic recording medium can be elongated so that long-time recording and enlargement of the capacity are permitted.

The thin metal magnetic film has been formed by a method with which a ferromagnetic metal material is heated and evaporated in a vacuum so as to be deposited on the non-magnetic support member. As an alternative to this, a so-called PVD technique may be employed, for example, an ion plating method with which evaporation of a ferromagnetic metal material is performed during discharge or a sputtering method with which glow discharge is caused to occur in an atmosphere, the main component of which is argon, so as to use generated argon ions to cause atoms on the surface of the target to be discharged.

When the thin metal magnetic film is formed, the bond strength with the continuous coating film 2 is increased or corrosion resistance, the wear resistance or the like of the thin metal magnetic film is improved by performing the film forming operation in an atmosphere in which oxygen gas is predominant.

The surface of the non-magnetic support member 3 opposite to the main surface 3a on which the magnetic layer 4 is formed may be provided with a backcoat layer (not shown) in order to improve the moving characteristic and the durability. The backcoat layer may be made of known materials, such as a material obtained by dispersing non-magnetic pigment, such as carbon or calcium carbonate in a binder, such as vinyl chloride-vinyl acetate copolymer. The surface of the magnetic layer 4 constituted by the thin metal magnetic film may be provided with a hard carbon film in order to improve the durability and weather resistance of the magnetic recording medium. It is preferable that the hard carbon film is formed by a sputtering method or a chemical vapor deposition (CVD) method to have a thickness of about 6 nm to about 10 nm which does not exert an influence on the spacing and the characteristics of the tape. Moreover, the magnetic layer 4 may have lubricant to improve the movement characteristic owing to the shape of each granular projection of the magnetic material.

If necessary, a variety of additives, such as a rust preventive agent and an antistatic agent, may be, by a known means, allowed to present on the right and reverse sides of the magnetic recording medium, in the portions adjacent to the foregoing sides or in the magnetic layer 4 (in the voids of the ferromagnetic thin metal film), on the interface between the non-magnetic support member 3 and the magnetic layer 4 and in the non-magnetic support member 3.

The magnetic recording medium according to this embodiment and structured as described above incorporates the non-magnetic support member 3 having the specified kurtosis (Ku), average roughness (SRa) of the central surface and average roughness (SRz) of ten points. Therefore, the surface of the magnetic recording medium opposite to the magnetic head has substantially the same surface characteristics as those of the main surface of the non-magnetic support member 3.

The magnetic recording medium according to this embodiment has the structure that the main surface of the non-magnetic support member 3 has the specified kurtosis Ku of 10.0 to 50. It is preferable that the kurtosis Ku is not smaller than 20. If the kurtosis Ku is smaller than 10, the actual contact area with the magnetic head is enlarged excessively and, therefore, durability against movement becomes unsatisfactory. If the kurtosis (Ku) is larger than 50, the small projections 6 can easily be cut. Thus, satisfactory durability against movement and a predetermined friction coefficient cannot be maintained.

The magnetic recording medium according to this embodiment has the structure that the main surface 3a of the non-magnetic support member 3 has the specified average roughness (SRa) of the central surface of 1.0 nm to 5.0 nm. It is preferable that the average roughness (SRa) of the central surface satisfies a range from 1.2 nm to 2.0 nm. If the magnetic recording medium according to this embodiment has the structure that the average roughness (SRa) of the central surface is smaller than 1.0 nm, the surface is too smooth to realize satisfactory durability against movement. If the average roughness (SRa) of the central surface is larger than 5.0 nm, the surface is too rough to maintain the electromagnetic conversion characteristic.

The magnetic recording medium according to this embodiment has the specified average roughness (SRz) of ten points of 15 nm to 50 nm. If the average roughness (SRz) of ten points satisfies a range from 30 nm to 40 nm. If the SRz of the magnetic recording medium is smaller than 15 nm, the surface is too smooth to obtain satisfactory durability against movement. If SRz is larger than 50 nm, the surface is too rough to maintain the electromagnetic conversion characteristic.

Therefore, the magnetic recording medium according to this embodiment has the structure that Ku is 10 to 50, SRa is 1.0 nm to 5.0 nm and SRz is 15 nm to 50 nm. Therefore, an excellent state of contact with the magnetic head can be maintained for a long time. Thus, satisfactory durability against movement and a sufficient electromagnetic conversion characteristic can be realized.

It is preferable that the small projections 6 of the magnetic recording medium according to this embodiment are formed at a density of 5,000,000 pieces/mm$^2$ to 50,000,000 pieces/mm$^2$, more preferably 8,000,000 pieces/mm$^2$ to 20,000,000 pieces/mm$^2$. Since the density of the small projections 6 satisfies the foregoing range, the magnetic recording medium according to this embodiment has excellent durability against movement.

It is preferable that the non-magnetic support member 3 of the magnetic recording medium according to this embodiment is oriented in the lengthwise direction (in the direction of MD) and widthwise direction (in the direction of TD) to adjust the Young's modulus of elasticity in the lengthwise direction and the widthwise direction. Specifically, it is preferable that the non-magnetic support member 3 is structured such that the Young's modulus of elasticity in the lengthwise direction is 1000 kg/mm$^2$ or higher and that in the widthwise direction is 1300 kg/mm$^2$ or higher. Since the Young's modulus of elasticity in the lengthwise direction of the non-magnetic support member 3 and that in the widthwise direction of the same are specified as described above, satisfactory contact with the magnetic head of the magnetic recording medium can be improved.

The non-magnetic support member 3 of the magnetic recording medium according to this embodiment has a reduced thickness. Specifically, it is preferable that the thickness of the non-magnetic support member 3 is 2.0 µm to 5.0 µm. If the thickness of the non-magnetic support member 3 is smaller than 2.0 µm, there is apprehension that the rigidity of the magnetic recording medium is unsatisfactory. If the thickness of the non-magnetic support member 3 is larger than 5.0 µm, the overall thickness of the magnetic recording medium cannot easily be reduced. Therefore, there is apprehension that required long-time recording cannot be realized. When the thickness of the non-magnetic support member 3 of the magnetic recording medium satisfies the foregoing range, the overall thickness of the magnetic recording medium can be reduced. As a result, required long-time recording can be realized. Moreover, satisfactory rigidity can be obtained.

The magnetic recording medium according to this embodiment has the structure that the continuous coating film 2 contains the small particles 5 so that the above-mentioned small projections 6 are formed. The average particle size of the small particles 5 of the magnetic recording medium according to this embodiment is specified, the size or the like of the small projections 6 can be controlled. Specifically, it is preferable that the average particle size of the small particles 5 satisfies a range from 5 nm to 100 nm, more preferably 10 nm to 50 nm. If the average particle size of the small particles 5 is smaller than 5 nm, the size of the small projections 6 is unsatisfactorily small. Thus, the movement characteristic of the magnetic recording medium deteriorates, causing a scuff to occur. Moreover, separation of powder from the magnetic layer 4 causes the electromagnetic conversion characteristic to deteriorate and/or the error rate to undesirably be raised. If the average particle size of the small particles is larger than 200 nm, the size of the small projections 6 is enlarged excessively. Thus, there is apprehension that the spacing loss from the magnetic head is enlarged and, therefore, the electromagnetic conversion characteristic deteriorates. When the average particle size of the small particles 5 of the magnetic recording medium satisfies the foregoing range, the required small projections 6 can be formed. As a result, excellent durability against movement can be realized and a satisfactory electromagnetic conversion characteristic can be realized.

It is preferable that the thickness of the continuous coating film 2 of the magnetic recording medium according to this embodiment satisfies a range from 1 nm to 100 nm, more preferably a range from 5 nm to 20 nm. If the thickness of the continuous coating film 2 is smaller than 1 nm, there is apprehension that the small particles separates. If the thickness of the continuous coating film 2 is larger than 100 nm, the surface roughness is coarsened excessively. In the foregoing case, there is apprehension that noise increases and the electromagnetic conversion characteristic deteriorates. When the thickness of the continuous coating film 2 of the magnetic recording medium according to this embodiment satisfies the foregoing range, the small projections 6 can reliably be formed. Moreover, an excellent electromagnetic conversion characteristic can be realized.

The magnetic recording medium according to this embodiment has coarse projections on the main surface by the inactive particles contained in the base layer 1. The foregoing coarse projections enables an effect of cleaning the magnetic head to be obtained.

It is preferable that the average particle size of the inactive particles for forming the coarse projections is 50 nm to 200 nm. It is preferable that the foregoing coarse projections are formed at a density of 1 piece/mm$^2$ to 100,000 pieces/mm$^2$. When the coarse projections are formed by using inactive particles having a size smaller than 50 nm or when the coarse projections are formed at a density lower than 10,000 pieces/mm$^2$, a satisfactory effect of cleaning the magnetic head cannot be obtained. Thus, there is apprehension that excess deposit or the like deposits on the magnetic head. If the coarse projections are formed by using inactive particles having a size larger than 200 nm or the coarse projections are formed at a density higher than 100,000 pieces/mm$^2$, there is apprehension that the electromagnetic conversion characteristic deteriorates and/or the error rate is raised.

Therefore, when the coarse projections are formed at a density of 1 piece/mm$^2$ to 100,000 pieces/mm$^2$ by using inactive particles having the average particle size of 50 nm to 200 nm, an excellent effect of cleaning the magnetic head can be obtained. As a result, the movement characteristic and wear resistance can significantly be improved. Moreover, an excellent electromagnetic conversion characteristic can be realized.

The present invention is not limited to the structure of the base layer 1 which is constituted by the aromatic polyamide film in the form of a single layer. For example, a structure may be employed in which the base layer 1 is constituted by a plurality of aromatic polyamide films. In the foregoing case, it is preferable that the surface of the base layer 1 opposite to the surface on which the magnetic layer is formed is coarsened. As a result, required friction of the base layer 1 can be realized so that an excellent handling characteristic is obtained.

The foregoing magnetic recording medium has the small projections formed by causing small particles to be contained in the continuous coating film. The structure of the magnetic recording medium according to the present invention is not limited to the foregoing structure. A structure may be employed which incorporates a base layer 1 in the form of a single layer and the small projections 6 are formed by the small particles 5 contained in the base layer 1. In the foregoing case, the non-magnetic support member 3 constituted by the base layer 1 which contains the small particles 5 can be formed by adding the small particles 5 to a raw material for the base layer and by performing a known method (for example, a melting and extruding method).

The above-mentioned magnetic recording medium has the structure that the non-magnetic support member 3 incorporates the base layer 1 in the form of a single layer. To realize handling easiness when the film is formed or when a process for manufacturing the tape, a base layer 1 may be employed in the form of two or more layers and having a coarsened surface.

The density of the small projections 6 or the coarse projections were measured by using a scanning electron microscope (SEM) (high-resolution COLD FE-SEM S-900 (trade name of Japan Electron Optics) under conditions that an accelerated voltage was 2 kV to 20 kV and the magnification was 5000 times to 30,000 times. The number of the projections was shown as the number of projections per 1 mm$^2$.

The thickness of the continuous coating film 2 was calculated from the density of the small projections 6 and the quantity of added soluble polymer.

The Young's modulus of elasticity of the non-magnetic support member 3 was measured by using a tensilon-type tension testing machine under conditions that the temperature was 25° C. and the relative humidity was 55%.

EXAMPLES

Example of manufactured magnetic recording mediums according to the present invention will now be described. As a matter of course, the present invention is not limited to the following examples.

Example 1

Initially, the non-magnetic support member was manufactured as follows.

Stirring and dissolving 2-chloro-p-phenylene diamine corresponding to a molar ratio of 0.9 mol and 4,4'-diaminophenyl sulfon corresponding to a molar ratio of 0.1 mol in dehydrated n-methyl pyrolidone were performed. Then, the solution was cooled. Then, chloride terephthalate corresponding to a molar ratio of 0.7 mol was added to the solution. Then, the solution was stirred for about two hours. Then, calcium hydroxide which was sufficiently be refined was added and the solution was stirred so that aromatic polyamide solution was obtained.

Inactive particles were added to the aromatic polyamide solution so as to be dispersed, and then the solution was, at 30° C., caused to uniformly flow along the surface of a metal drum having a polished surface. Then, the metal drum was dried in an atmosphere of 120° C. for about 10 minutes so that an aromatic polyamide film was formed. The inactive particles were silica having an average particle size of 50 nm to 200 nm. The quantity of the added inactive particles was 0.005 wt % to 0.1 wt %.

The aromatic polyamide film was separated from the metal drum, and then the aromatic polyamide film was oriented to 1.1 times in the lengthwise direction while the aromatic polyamide film was, for 30 minutes, being continuously immersed in a water tank, the temperature of which was 30° C. Moreover, the aromatic polyamide film was introduced into a tenter so as to be oriented to 1.3 times in the widthwise direction at 320° C. Thus, a base layer was obtained which had a Young's modulus of elasticity of 1000 kg/mm$^2$ in the longitudinal direction and that of 1300 kg/mm$^2$ in the widthwise direction and a thickness of 4 μm.

Then, the surface of the base layer was coated with coating solution containing 0.005 part of SiO$_2$ serving as the small particles and having an average particle size of 12 nm at a density of 4.5 g per 1 m$^2$. Then, the surface of the base layer was dried so that a continuous coating film was formed.

Figure 2:
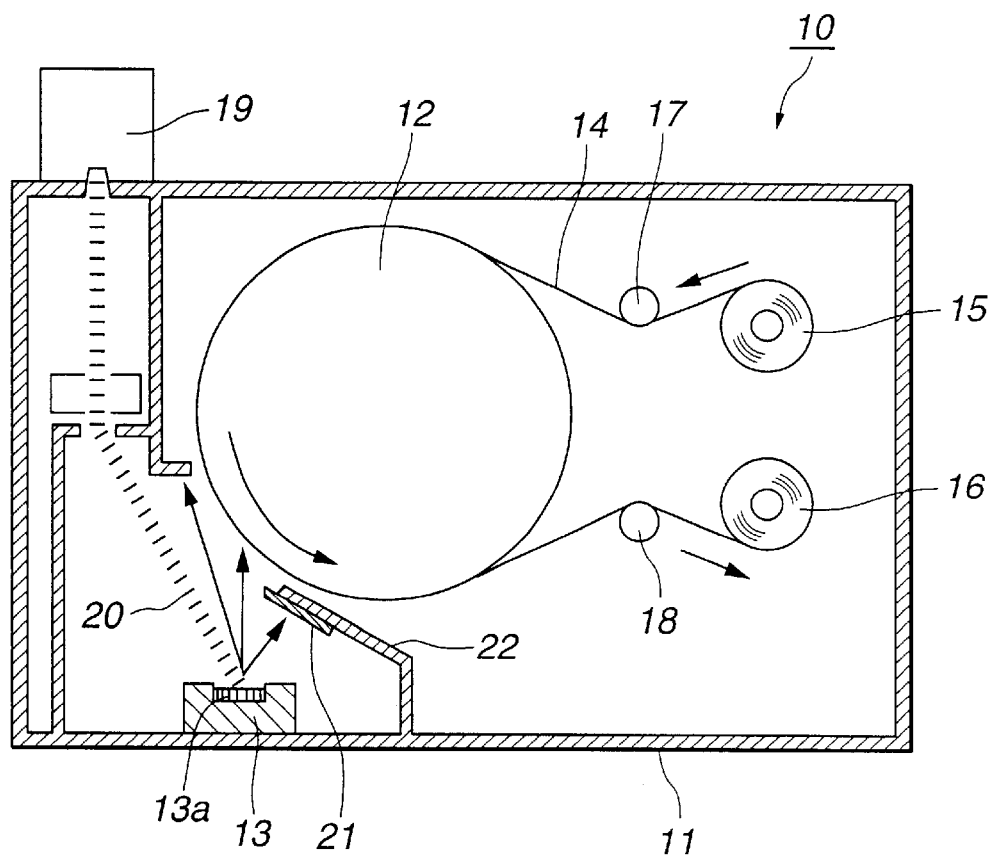
FIG. 2 is a diagram showing the structure of a continuously winding type vacuum evaporating apparatus for forming a ferromagnetic thin metal film.

Then, a continuous winding type evaporating apparatus 10 structured as shown in FIG. 2 was operated to form a magnetic layer on the thus-manufactured non-magnetic support member.

The continuous winding type evaporating apparatus 10 incorporates a vacuum chamber 11, the inside portion of which was in a vacuum state of about 10$^{-3}$ Pa; and a crucible 13 for accommodating an evaporation material source (Co) 13a for forming a thin metal magnetic film was disposed opposite to a cooling can 12.

The cooling can 12 was cooled to −20° C. and arranged to be rotated counterclockwise when viewed in the drawing.

The non-magnetic support member 14 was delivered from a winding roll 16 at a delivering rate of 50 m/minute so as to be moved along the surface of the cooling can 12. Thus, the non-magnetic support member 14 was wound around a winding roll 16. Note that a guide roller 17 was disposed between the supply roll 15 and the cooling can 12. Moreover, a guide roller 18 was disposed between the cooling can 12 and the winding roll 16. Thus, the non-magnetic support member 14 was able to, under a predetermined tension, smoothly move between the supply roll 15 and the cooling can 12 and between the cooling can 12 and the winding roll 16.

The evaporation material source 13a was irradiated with accelerated electron beams 20 emitted from an electron-beam generating source 19. The evaporation material source 13a irradiated with accelerated electron beams 20 was heated and evaporated so as to be allowed to adhere (evaporated) to the surface of the non-magnetic support member 14 which was being moved along the surface of the cooling can 12. An adhesion preventive plate 22, to which a shutter 21 was joined such that adjustment of the position of the shutter 21 was permitted, was disposed between the evaporation material source 13a and the cooling can 12. Therefore, particles which must be evaporated were made incident on the non-magnetic support member 14 at a predetermined angle. Hence it follows that magnetic particles were diagonally oriented with respect to the surface of the non-magnetic support member 14 so that a magnetic layer was formed on the surface of the non-magnetic support member 14. Note that the thickness of the magnetic layer was 180 nm.

When the thin metal magnetic film was formed by evaporation, oxygen gas was supplied to the surface of the non-magnetic support member 14 through an oxygen-gas introducing opening (not shown) at a flow rate of 2 L/minute. Thus, the magnetic characteristics, durability and the weather resistance of the thin metal magnetic film were improved.

Then, a hard carbon film was formed on the magnetic layer by a sputtering method. The sputtering operation was performed under conditions that the degree of vacuum was 0.8 Pa in an Ar gas atmosphere, the tape moving speed was 5 m/minute and the thickness of the hard carbon film was 5 nm.

Then, the hard carbon film was coated with 0.1 wt % solution of an organic rust preventive agent by a coating machine incorporating a gravure roll. Then, the hard carbon film was dried at 100° C. by operating a drier. Then, lubricant, which was 0.5 wt % solution mainly composed of an organic substance constituted by perfluoropolyether derivative, was applied by similarly using the gravure roll. Then, the solution was dried. The thus-formed layer was a top coat layer.

Then, a backcoat layer (having a thickness of 0.5 $\mu$m) mainly composed of carbon and containing vinyl chloride resin serving as a binder was formed on the reverse side of the non-magnetic support member.

Then, the thus-obtained original magnetic recording medium was cut to have a width of 8 mm so that sample tapes were manufactured.

Examples 2 to 5

In Examples 2 to 5, magnetic recording mediums were manufactured similarly to Example 1 except for the structure that the average particle size and the quantity of $SiO_2$, which was contained in the continuous coating film were adjusted to adjust the kurtosis (Ku), the average roughness (SRa) of the central surface and the average roughness (SRz) of ten points.

Example 6

In Example 6, a magnetic recording medium was manufactured similarly to Example 1 except for the structure that the conditions under which the base layer was formed were changed to make the Young's modulus of elasticity in the longitudinal direction to be 1200 kg/mm$^2$ and that in the widthwise direction to be 1600 kg/mm$^2$.

Example 7

In Example 7, a magnetic recording medium was manufactured similarly to Example 1 except for the structure that the base layer did not contain the inactive particles.

Example 8

In Example 8, a magnetic recording medium was manufactured similarly to Example 1 except for the structure that the continuous coating film was not used and a base layer having the small projections and in the form of a single layer was used.

Example 9

In Example 9, a magnetic recording medium was manufactured similarly to Example 1 except for the structure that the conditions under which the base layer was formed were changed to make the Young's modulus of elasticity in the longitudinal direction to be 900 kg/mm$^2$ and that in the widthwise direction to be 1200 kg/mm$^2$.

Comparative Examples 1 to 6

In Comparative Examples 1 to 6, magnetic recording mediums were manufactured similarly to Example 1 except for the structure that the average particle size and the quantity of $SiO_2$ which was contained in the continuous coating film were adjusted to adjust the kurtosis (Ku), the average roughness (SRa) of the central surface and the average roughness (SRz) of ten points.

Examples 1 to 9 and Comparative Examples 1 to 6 were examined such that the kurtosis (Ku), the average roughness (SRa) of the central surface, the average roughness (SRz) of ten points which were parameters of the surface roughness and Young's modulus of elasticity of the non-magnetic support member in the lengthwise direction (MD) and that in the widthwise direction (TD) were measured. Results were shown in Table 1.

TABLE 1

|  | Parameter of Surface Roughness (nm) | | | Young's modulus of elasticity (kg/mm$^2$) | |
| --- | --- | --- | --- | --- | --- |
|  | Ku | Sra | Srz | MD | TD |
| Example 1 | 25 | 1.1 | 28 | 1000 | 1300 |
| Example 2 | 27 | 1.4 | 30 | 1000 | 1300 |
| Example 3 | 33 | 1.5 | 40 | 1000 | 1300 |
| Example 4 | 10 | 1.0 | 18 | 1000 | 1300 |
| Example 5 | 40 | 4.5 | 50 | 1000 | 1300 |
| Example 6 | 25 | 1.2 | 28 | 1200 | 1600 |
| Example 7 | 25 | 1.1 | 28 | 1000 | 1300 |
| Example 8 | 21 | 1.0 | 24 | 1000 | 1300 |
| Example 9 | 25 | 1.1 | 28 | 900 | 1200 |
| Comparative | 8 | 2.4 | 40 | 1000 | 1300 |

TABLE 1-continued

| | Parameter of Surface Roughness (nm) | | | Young's modulus of elasticity (kg/mm$^2$) | |
|---|---|---|---|---|---|
| | Ku | Sra | Srz | MD | TD |
| Example 1 Comparative Example 2 | 40 | 7.0 | 48 | 1000 | 1300 |
| Comparative Example 3 | 25 | 0.6 | 30 | 1000 | 1300 |
| Comparative Example 4 | 34 | 3.6 | 80 | 1000 | 1300 |
| Comparative Example 5 | 10 | 1.0 | 12 | 1000 | 1300 |
| Comparative Example 6 | 55 | 2.4 | 30 | 1000 | 1300 |

Test for Evaluating Characteristic

The foregoing characteristics of thus-manufactured Examples 1 to 9 and Comparative Examples 1 to 6 were evaluated.

[Characteristics of Tapes]

The characteristics of the tapes were evaluated by using a modified AIT drive SDX-S300C (trade name of Sony). The recording operations were performed at relative speed of 10.04 m/second and a shortest recording wavelength of 0.35 μm.

Durability

Each sample having a length of 10 cm was repeatedly subjected to recording and reproducing operations to measure the number of times at which any output was obtained.

Error Rate

Deterioration of the electromagnetic conversion characteristic of the magnetic tape for data caused from cutting of the surface of the tape was detected as an error rate. The error rates were measured such that a specimen of each sample having a length of 170 m was moved by 1000 passes. An error rate realized after one pass was performed and a block error rate realized after 1000 passes were measured. Note that each sample resulted in an error rate which was lower than $1 \times 10^{-3}$/minute.

[Friction Resistance]

The friction resistance was measured such that each sample tape was repeatedly slid with respect to a guide pin (SUS: 0.2S) 1,000 times. Then, the friction coefficient of the surface of each sample tape was measured. At this time, conditions under which the friction coefficient was measured were such that the temperature and the humidity were room temperature and the room humidity (25° C. and 55%) and a load of 10 g was applied and the sliding speed was 5 mm/second.

Results were shown in Table 2.

TABLE 2

| | Durability | Friction Coefficient | | Block Error Rate | |
|---|---|---|---|---|---|
| | (times) | 1 Pass | 100 Passes | 1 Pass | 100 Passes |
| Example 1 | >5000 | 0.24 | 0.42 | $2 \times 10^{-3}$ | $5 \times 10^{-3}$ |
| Example 2 | >5000 | 0.20 | 0.26 | $3 \times 10^{-3}$ | $4 \times 10^{-3}$ |
| Example 3 | >5000 | 0.18 | 0.24 | $4 \times 10^{-3}$ | $5 \times 10^{-3}$ |
| Example 4 | >5000 | 0.30 | 0.36 | $1 \times 10^{-3}$ | $5 \times 10^{-3}$ |
| Example 5 | >5000 | 0.20 | 0.22 | $7 \times 10^{-3}$ | $9 \times 10^{-3}$ |
| Example 6 | >5000 | 0.22 | 0.28 | $1 \times 10^{-3}$ | $4 \times 10^{-3}$ |
| Example 7 | >5000 | 0.30 | 0.35 | $1 \times 10^{-3}$ | $4 \times 10^{-3}$ |
| Example 8 | >5000 | 0.26 | 0.30 | $4 \times 10^{-3}$ | $5 \times 10^{-3}$ |

TABLE 2-continued

| | Durability | Friction Coefficient | | Block Error Rate | |
|---|---|---|---|---|---|
| | (times) | 1 Pass | 100 Passes | 1 Pass | 100 Passes |
| Example 9 | >5000 | 0.20 | 0.24 | $7 \times 10^{-3}$ | $9 \times 10^{-3}$ |
| Comparative Example 1 | 4000 | 0.30 | 0.34 | $4 \times 10^{-3}$ | $8 \times 10^{-2}$ |
| Comparative Example 2 | >5000 | 0.20 | 0.23 | $5 \times 10^{-2}$ | $6 \times 10^{-2}$ |
| Comparative Example 3 | 4000 | 0.30 | 0.40 | $1 \times 10^{-3}$ | $3 \times 10^{-2}$ |
| Comparative Example 4 | >5000 | 0.22 | 0.24 | $4 \times 10^{-2}$ | $5 \times 10^{-2}$ |
| Comparative Example 5 | 500 | 0.40 | 0.50 | $3 \times 10^{-3}$ | $6 \times 10^{-2}$ |
| Comparative Example 6 | 4000 | 0.23 | 0.50 | $4 \times 10^{-3}$ | $8 \times 10^{-2}$ |

As can be understood from Table 2, the samples according to Examples 1 to 9 and having the kurtosis (Ku), the average roughness (SRa) of the central surface and the average roughness (SRz) of ten points, which were parameters of the surface roughness exhibit excellent durability, low error rates and satisfactory friction characteristics.

On the other hand, the samples according to Comparative Examples 1 to 5 had the kurtosis (Ku), the average roughness (SRa) of the central surface and the average roughness (SRz) of ten points, any one of which was deviated from the above-mentioned ranges. Therefore, the characteristics including the durability and the friction coefficient resulted in unsatisfactory values.

When a comparison between Examples 1 and 6 and Example 9 was made, a sample having the Young's modulus of elasticity of the non-magnetic support member in the lengthwise direction which was higher than 1000 and that in the widthwise direction which was higher than 1300 exhibited excellent durability and friction coefficient realized after 100 passes were performed. In the present invention, the kurtosis (Ku), the average roughness (SRa) of the central surface and the average roughness (SRz) of ten points, which were the parameters of the surface roughness, satisfied the foregoing range. Moreover, the Young's modulus of elasticity of the non-magnetic support member in the lengthwise direction and that in the widthwise direction were larger than the predetermined values. As a result, a magnetic recording medium exhibiting an excellent electromagnetic conversion characteristic and durability against movement was obtained.

As described above, the magnetic recording medium according to the present invention has the structure that at least either main surface of the non-magnetic support member satisfies the specified Ku (Kurtosis), average roughness SRa of the central surface and average roughness SRz of ten points. Therefore, the magnetic recording medium according to the present invention is able to simultaneously realize excellent an electromagnetic conversion characteristic and durability. Therefore, the error rate can be lowered.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic recording medium comprising:
    a non-magnetic support member on which a magnetic layer constituted by a thin metal magnetic film is formed, the non-magnetic support member having at least two main surfaces, wherein at least either one of the at least two main surfaces of the non-magnetic support member has first projections, and wherein a main surface of the non-magnetic support member having the first projections formed thereon has a kurtosis (Ku) which is expressed by the following equation (1) and which is 10.0 to 50.0, $$Ku = (1/SRq^4) \cdot (1/n) \sum_{i=}^{n} Yi^4 \qquad (1)$$

$$SRq = \sqrt{(1/Lx \cdot Ly) \int_0^{Lx} \int_0^{Ly} f(x, y)^2 \, dx \, dy}$$

where f(x) is a roughness curve with respect to the central surface and Lx and Ly are lengths in the directions X and Y on the surface, average roughness Ra at the central surface of either main surface of the non-magnetic support member is 1.0 nm to 5.0 nm, and average roughness Rz of ten points on either main surface of the non-magnetic support member is 15 nm to 50 nm.

2. A magnetic recording medium according to claim 1, wherein the non-magnetic support member incorporates an aromatic polyamide film and a continuous coating film formed on the aromatic polyamide film and wherein the non-magnetic support member includes particles having an average particle size of 5 nm to 100 nm.

3. A magnetic recording medium according to claim 2, wherein the aromatic polyamide film has a Young's modulus of elasticity of 1000 kg/mm$^2$ or higher in the lengthwise direction and a Young's modulus of elasticity of 1300 kg/mm$^2$ or higher in the widthwise direction.

4. A magnetic recording medium according to claim 1, wherein the first projections are formed at a density of 5,000,000 pieces/mm$^2$ to 50,000,000 pieces/mm$^2$.

5. A magnetic recording medium according to claim 2, wherein the thickness of the continuous coating film is 1 nm to 100 nm.

6. A magnetic recording medium according to claim 1, wherein the non-magnetic support member contains inactive particles having an average particle size of 50 nm to 200 nm and the non-magnetic support member has, on the surface thereof, second projections larger than the first projections.

7. A magnetic recording medium according to claim 6, wherein the second projections are formed at a density of 1 piece/mm$^2$ to 100,000 pieces/mm$^2$.

8. A magnetic recording medium according to claim 1, wherein the thickness of the non-magnetic support member is 2.0 μm to 5.0 μm.

* * * * *